(12) United States Patent
Huang et al.

(10) Patent No.: US 8,740,446 B2
(45) Date of Patent: Jun. 3, 2014

(54) LIGHT GUIDE PLATE POSITIONING DESIGN IN BACKLIGHT MODULE

(75) Inventors: Jien-Feng Huang, Hsin-Chu (TW); Chi-Chen Huang, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 406 days.

(21) Appl. No.: 13/228,683

(22) Filed: Sep. 9, 2011

(65) Prior Publication Data

US 2012/0170311 A1    Jul. 5, 2012

(30) Foreign Application Priority Data

Dec. 30, 2010   (TW) ............................... 99147018 A

(51) Int. Cl.
*F21V 7/04*    (2006.01)

(52) U.S. Cl.
USPC .......... 362/633; 362/632; 362/97.1; 362/97.2

(58) Field of Classification Search
USPC ................................ 362/632–634, 97.1–97.4
See application file for complete search history.

(56) References Cited

U.S. PATENT DOCUMENTS

| | | | | |
|---|---|---|---|---|
| 7,333,163 | B2 * | 2/2008 | Huang et al. | 349/58 |
| 7,364,345 | B2 * | 4/2008 | Fang | 362/634 |
| 7,481,569 | B2 * | 1/2009 | Chang | 362/633 |
| 2008/0094855 | A1 * | 4/2008 | Yu et al. | 362/634 |

FOREIGN PATENT DOCUMENTS

| | | |
|---|---|---|
| CN | 1971376 A | 5/2007 |
| CN | 201359237 | 12/2009 |
| CN | 201611069 U | 10/2010 |
| EP | 2012157 A2 | 1/2009 |
| KR | 2006-0106961 A | 10/2006 |
| TW | 200722857 | 6/2007 |
| TW | M339699 | 9/2008 |

OTHER PUBLICATIONS

English translation of abstract and pertinent parts of CN 1971376 A.
English transtation of abstract and pertinent parts of CN 201611069 U.
English translation of abstract and pertinent parts of CN 201359237 Y.
China Office Action dated Sep. 10, 2012.
Englis translation of abstract of TW M339699.
TW Office Action dated Jan. 21, 2014.

* cited by examiner

*Primary Examiner* — Anabel Ton
(74) *Attorney, Agent, or Firm* — McClure, Qualey & Rodack, LLP

(57) ABSTRACT

A light guide plate positioning design in backlight module includes a base, a light guide plate, a first positioning unit, and a second positioning unit. The base has a sidewall extending along a second direction. The first positioning unit is disposed on the sidewall for contacting the light guide plate to resist a displacement of the light guide plate in a first direction, and further to position the light guide plate relatively to the sidewall in the first direction. The second positioning unit is disposed on the base for contacting the light guide plate to resist a displacement of the light guide plate in the second direction, and further to position the light guide plate in the second direction in a position along the side wall. The resistance of the first positioning unit to the displacement of the light guide plate is greater than that of the second positioning unit.

23 Claims, 10 Drawing Sheets

LIGHT GUIDE PLATE POSITIONING DESIGN IN BACKLIGHT MODULE

BACKGROUND OF THE INVENTION

1. Field of the Invention

The present invention generally relates to a backlight module. Particularly, the present invention relates to a light guide plate positioning design for a backlight module of a display device.

2. Description of the Prior Art

Liquid crystal display (LCD) has been extensively applied to various electronic products such as computers, televisions and mobile phones. Backlight module is one of the important components in the liquid crystal display, and the light source device used in the backlight module directly affects the performance and the assembly cost of the backlight module. Light emitting diodes (LED) become one of the light source commonly used due to its small volume and low energy consumption. In addition, the edge-lighting backlight module has received more attention compared to the bottom-lighting backlight module in virtue of its small thickness.

The usual edge-lighting backlight module includes a light source device, a light guide plate, and a support base. As FIG. 1 shows, the light guide plate 2 is positioned by the positioning pillars 4. The positioning pillar 4 positions the light guide plate 2 in order to assure a fixed relevant distance between the light guide plate and the light source device so that the structure and optical performance of the light guide plate will not be affected by high temperature of the light source device. In addition, the positioning pillars restrict degree of freedom of the light guide plate, and therefore can secure the light guide plate when performing environmental test such as impact or shock test. However, the collision between the light guide plate and the positioning pillars induced from impact or shock will result in cracks and breakage of the light guide plate. Moreover, if the strength of the positioning pillar is not strong enough, the environmental test will make the positioning pillar slant to lose the positioning function.

One conventional approach to improve the positioning ability and reduce the impact on the positioning pillar during the environmental test is usually through increasing the number of positioning pillars. However, increasing the positioning pillars also results in over restriction to degree of freedom during assembly of the light guide plate, and therefore raises difficulty in production control and test. On the other hand, increasing the positioning pillars also results in larger extent of tolerance and therefore affects the positioning function.

SUMMARY OF THE INVENTION

It is an object of the present invention to provide a backlight module having a light guide plate with reasonable assembly degree of freedom.

It is another object of the present invention to provide a backlight module, having better light-guide-plate positioning effect.

The backlight module of the present invention includes a base and a light guide plate. The base has a sidewall, and the light guide plate is disposed horizontally on the base. The light guide plate has a first edge, wherein the sidewall and the first edge extend along a second direction and correspond to each other. In addition, the sidewall does not contact the light guide plate. The backlight module further includes a first positioning unit and a second positioning unit. The first positioning unit is disposed on the sidewall and contacts the light guide plate to resist a displacement of the light guide plate in a first direction, and further to position the light guide plate relative to the sidewall in the first direction. The second positioning unit is disposed on the base and contacts the light guide plate to resist a displacement of the light guide plate in the second direction, and further to position the light guide plate relative to the sidewall in the second direction. The displacement resistance of the first positioning unit to the light guide plate is greater than the displacement resistance of the second positioning unit to the light guide plate.

The first positioning unit disposed on the sidewall is an elastic member. The elastic member has multiple connecting parts and at least one curved portion, wherein the elastic member is connected to the sidewall of the base by means of the connecting parts and contacts the light guide plate by means of the curved portion. The connection part includes a first clip portion and a second clip portion which are parallel to and spaced from each other, wherein the connection part is attached to the sidewall by the clip portions. The first clip portion and the second clip portion are connected through a bridging portion, wherein the first clip portion is connected with the curved portion. The curved portion is in an arch shape with a curved surface, wherein a middle section of the curved portion protrudes toward and touches against the first edge of the light guide plate.

The backlight module includes a positioning frame disposed on the base. The positioning frame includes a side plate contacting the base and a top plate connecting a top side of the side plate. The side plate is situated between the sidewall and the first edge of the light guide plate, wherein an opening is formed on the side allowing the curved portion to pass through to contact the first edge of the light guide plate.

DETAILED DESCRIPTION OF THE PREFERRED EMBODIMENT

Figure 1:
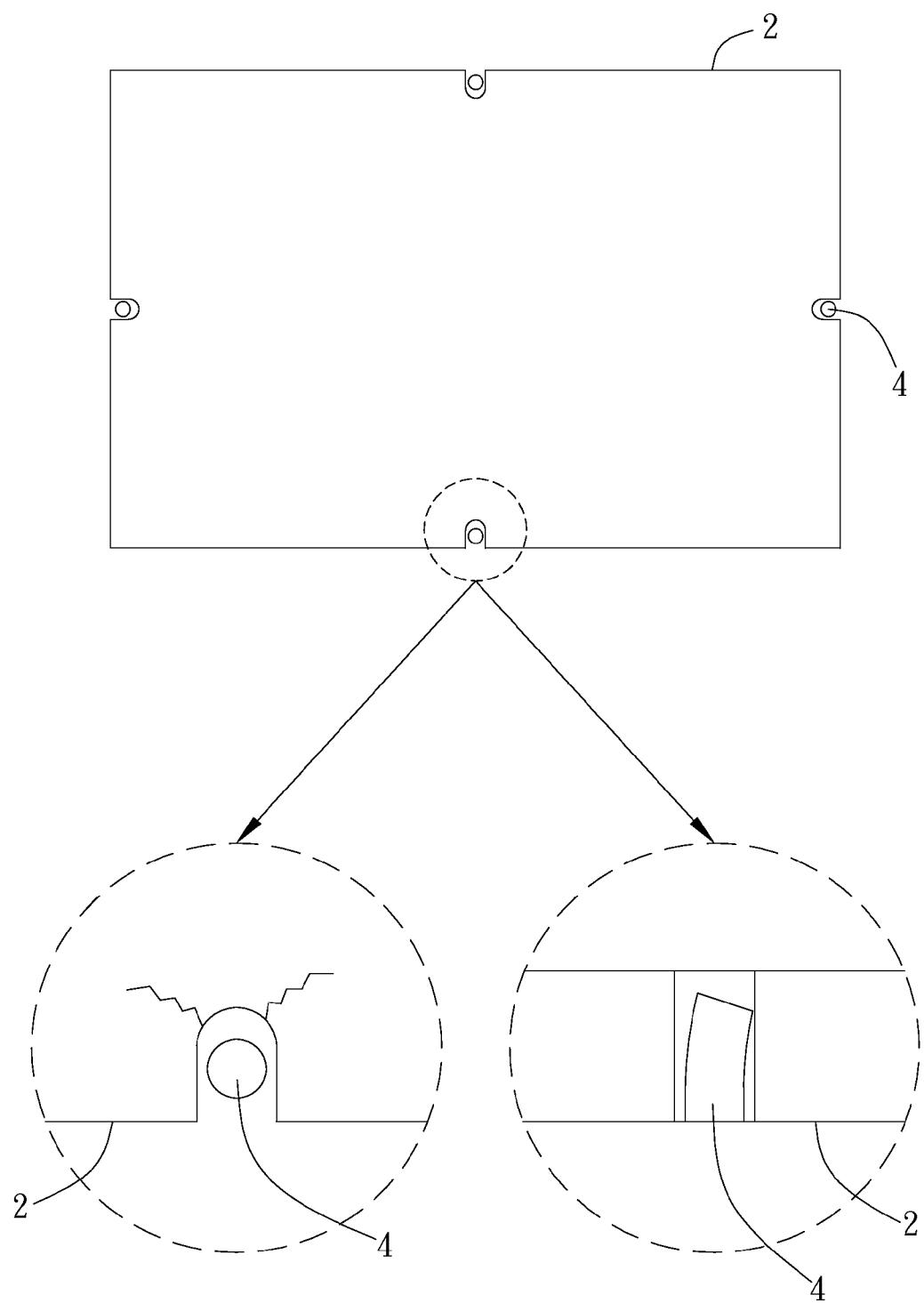
FIG. 1 shows a schematic view of the conventional positioning arrangement of the light guide plate.
Figure 2:
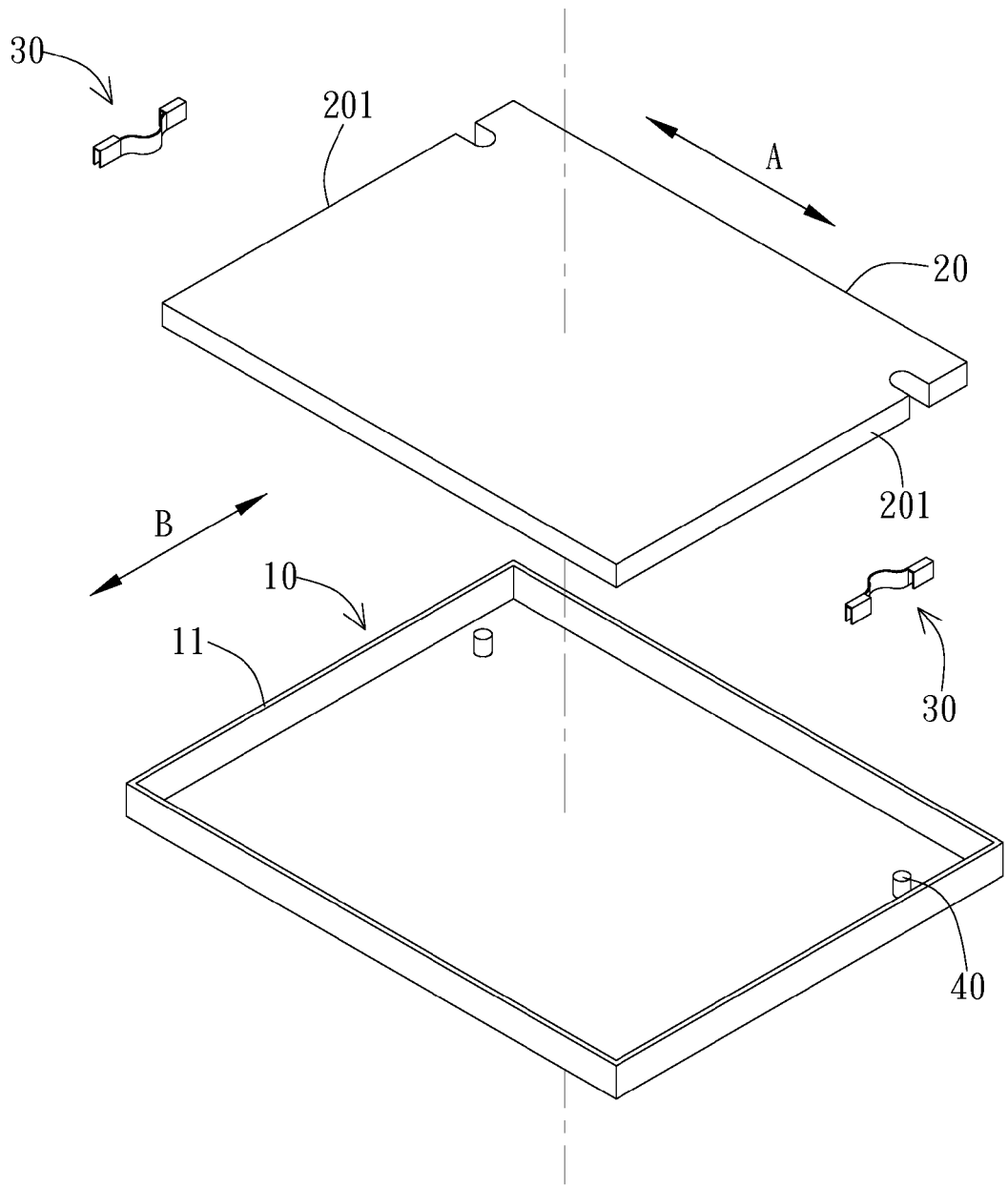
FIG. 2 is an exploded view of the embodiment of the present invention.
Figure 3A:
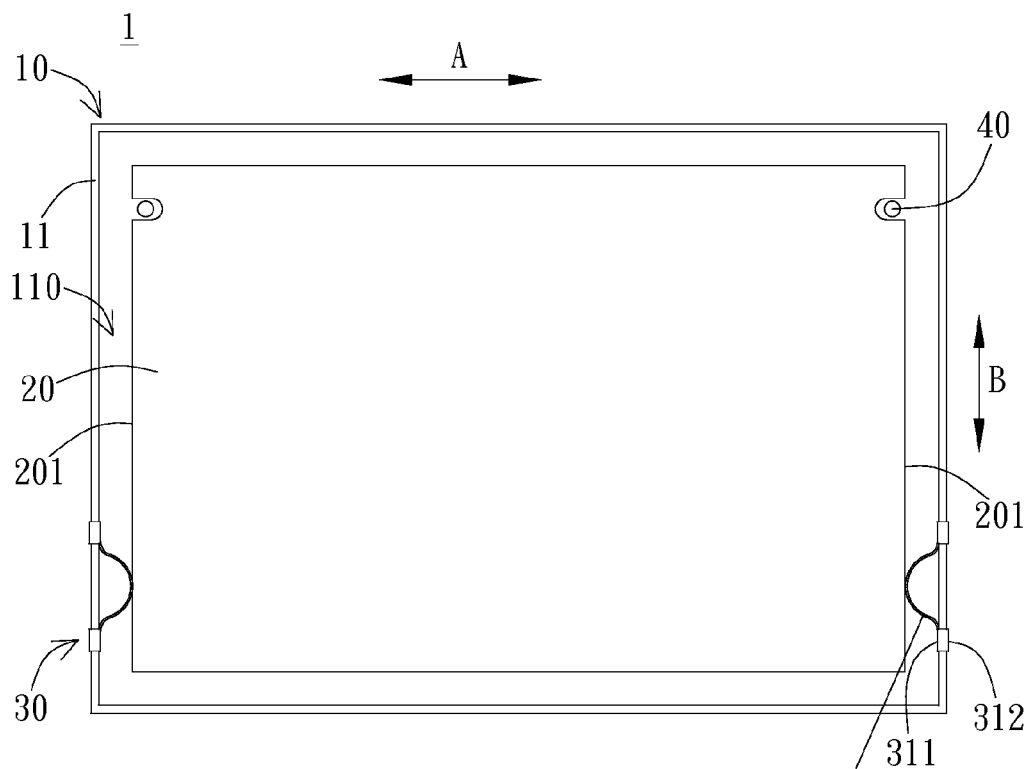
FIG. 3A is a top view of the embodiment of the present invention.

As the backlight module 1 of the present invention shown in FIGS. 2 and 3A, the backlight module 1 includes a base 10 and a light guide plate 20. The base 10 has a sidewall 11; the light guide plate 20 is disposed horizontally on the base 10 and has a first edge 201, wherein the sidewall 11 and the first edge 201 extend along a second direction B and correspond to each other. In addition, the sidewall 11 does not contact the light guide plate 20, therefore a trench 110 is formed between the sidewall 11 and the first edge 201. The backlight module 1 further includes a first positioning unit 30 and a second positioning unit 40. The first positioning unit 30 is disposed on the sidewall and contacts an edge of the light guide plate 20. The second positioning unit 40 is disposed on the base 10 and contacts an edge of the light guide plate 20. The contact/ interaction of the first positioning unit 30 and the light guide plate 20 resists a displacement of the light guide plate 20 in a first direction A and further positions the light guide plate 20 relatively to the sidewall 11 in the first direction A toward the sidewall 11. On the other hand, the contact/interaction of the second positioning unit 40 and the light guide plate 20 resists a displacement of the light guide plate 20 in the second direction B and further positions the light guide plate 20 relatively to the sidewall 11 in the second direction B along the sidewall 11. The difference between the first positioning unit 30 and the second positing unit 40 is not only in the restriction to the displacement direction of the light guide plate 20, but also in the strength of limiting the displacement. That is, a resistance of the first positioning unit 30 to the displacement of the light guide plate 20 is greater than a resistance of the second positioning unit 40 to the displacement of the light guide plate 20. For example, when the light guide plate 20 displaces toward the first positioning unit 30 in the first direction A, the first positioning unit 30 resists the displacement, which slows down the displacement speed or stops the displacement, or even change the displacement, namely making the light guide plate 20 substantially displace in a reverse direction i.e. displace away from the first positioning unit 30 practically in the first direction A. When the light guide plate 20 displaces toward the second positioning unit 40 in the second direction B, the second positioning unit 40 also resists the displacement; however, the resistance produces less effect on changing the displacement. In summary, when the light guide plate 20 displaces toward the first positioning unit 30 or the second positioning unit 40, the change in displacement provided by the first positioning unit 30 is greater than the change in displacement provided by the second positioning unit 40.

Figure 3B:
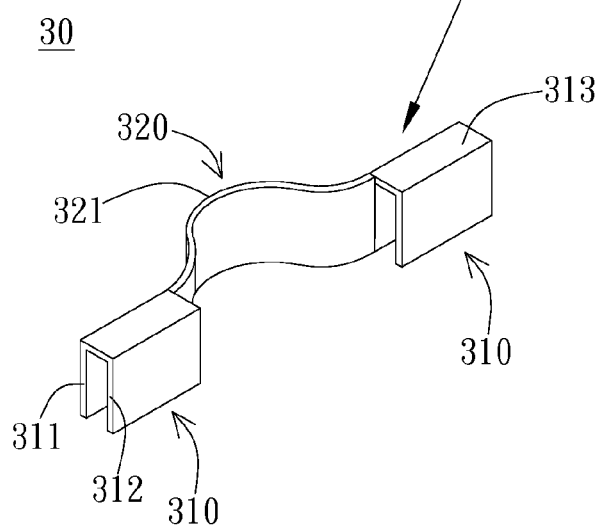
FIG. 3B is a schematic view of the first positioning unit of the embodiment of the present invention.

In the preferred embodiment of the present invention, the first positioning unit 30 is an elastic member. The elastic member is preferably made from metal. As FIGS. 3A-3B show, the elastic member 30 has at least one connecting part 310 and a curved portion 320. The elastic member 30 is connected to the sidewall 11 of the base 10 by the connecting part 310 and contacts the light guide plate 20 by the curved portion 320. Specifically, the curved portion 320 is disposed within the trench 110 and has a middle section 321 protruding toward and touching against the first edge 201 of the light guide plate 20. In addition, two ends of the curved portion 320 connect with the connecting parts 310. The curved portion 320 preferably has an arch shape with a curved surface, by which the elastic member 30 contacts the light guide plate 20 to position the light guide plate 20 relative to the sidewall 11 in the first direction A. Moreover, when the light guide plate 20 displaces upon impact, the elastic member 30 behaves as a cushion to prevent the light guide plate 20 from hitting against some other components such as the sidewall 11 of the backlight module 1 in the first direction A. On the other hand, because the base 10 of the backlight module 1 is responsible for supporting, the base 10 and the sidewall 11 thereon have to be more rigid. On the contrary, the elastic member 30 which is supported by the sidewall 11 is relatively less rigid and thinner than the sidewall 11. In summary, utilizing the material property and the structure described above, the elastic member 30 can reduce the impact on the light guide plate 20 when hitting against the elastic member 30.

As FIG. 3B shows, the connecting part 310 of the elastic member 30 includes a first clip portion 311 and a second clip portion 312, which are parallel to and spaced from each other. The elastic member 30 is attached to the sidewall 11 by clipping the sidewall 11 with the first clip portion 311 and the second clip portion 312. The first clip portion 311 and the second clip portion 312 are connected to a bridging portion 313 respectively through a side thereof. In other words, the first clip portion 311, the second clip portion 312, and the bridging portion 313 can be integrally formed as one piece, wherein the first clip portion 311 of the connecting part 310 is connected to the curved portion 320. Preferably, the first clip portion 311 and the second clip portion 312 are disposed on two opposite sides of the sidewall 11 respectively and in contact with the two opposite surfaces of the sidewall in an overlapping manner, wherein the first clip portion 311 and the 320 portion 313 connected thereto are together positioned at one side of the sidewall 11 facing the light guide plate 20 while the second clip portion 312 is positioned at the opposite side. As a result, the sidewall 11 is sandwiched between the first clip portion 311 and the second clip portion 312. In other words, the first clip portion 311 and the second clip portion 312 are apart from each other by a distance substantially equal to a thickness of the sidewall 11. In addition, the bridging portion 313 connecting the first clip portion 311 and the second clip portion 312 traverses across the top of the sidewall 11.

Figure 4A:
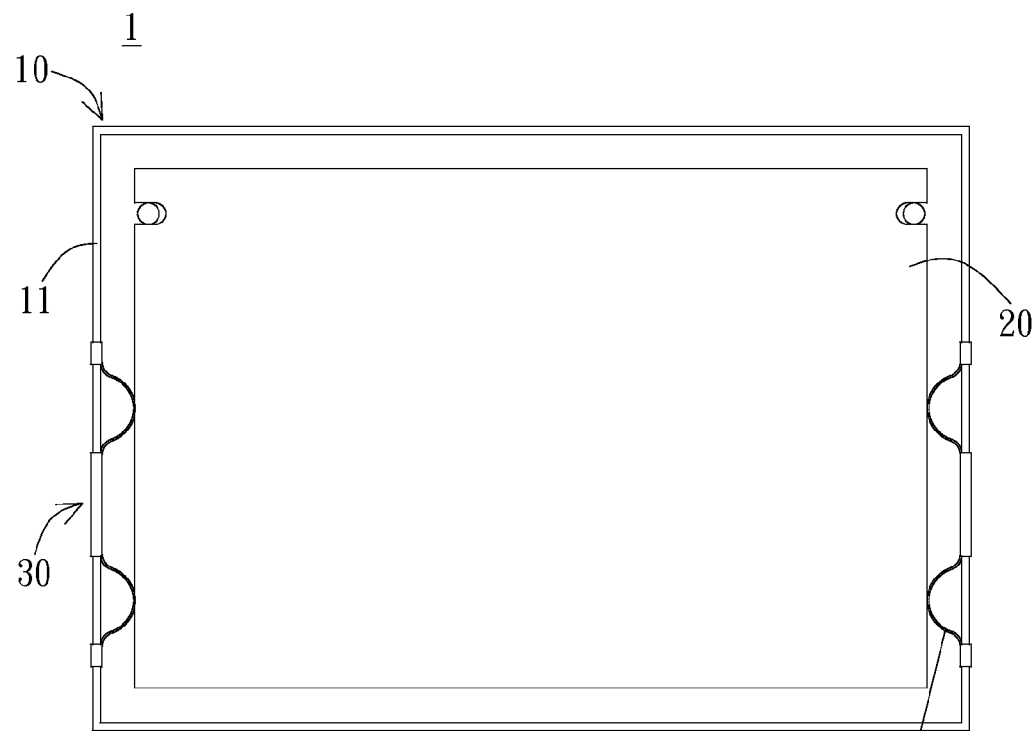
FIG. 4A is a top view of another embodiment of the present invention.
Figure 4B:
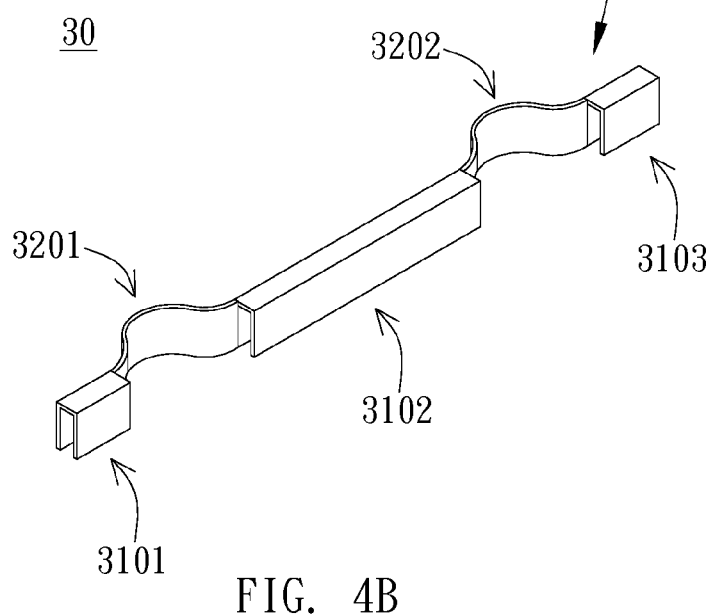
FIG. 4B is a schematic view of the first positioning unit of another embodiment of the present invention.
Figure 5A:
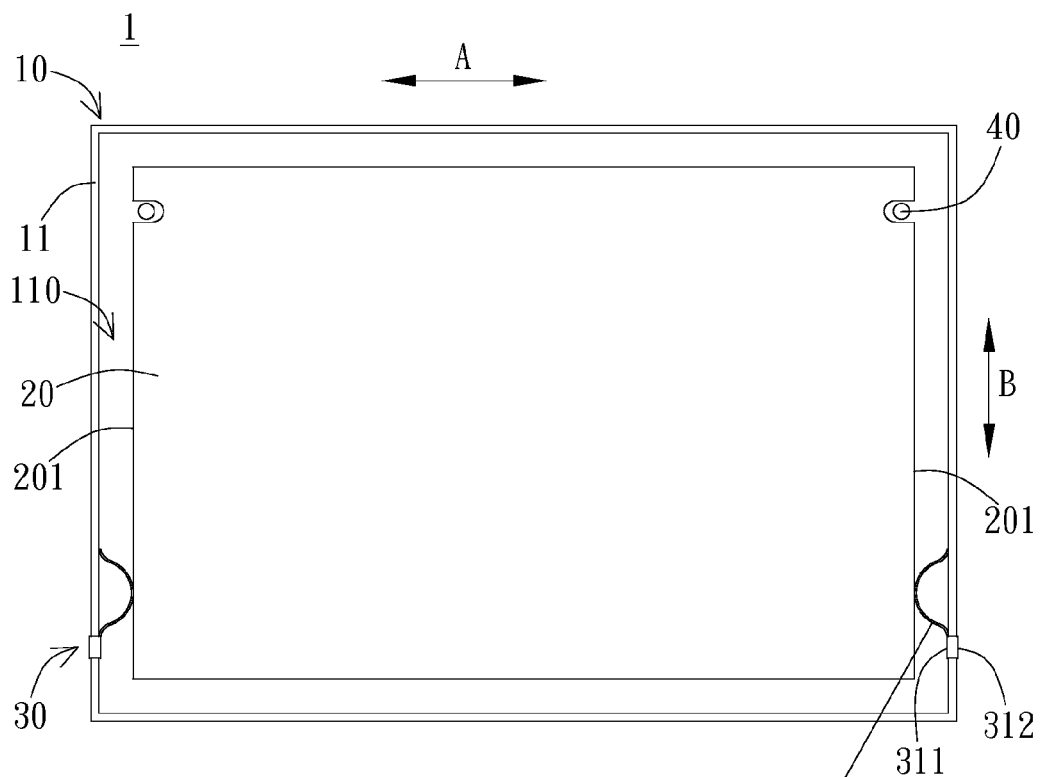
FIG. 5A is a top view of another embodiment of the present invention.

The elastic member 30 may include a plurality of connecting parts 310; the plurality of connecting parts 310 connect to the curved portion 320. As FIG. 3B shows, the elastic member 30 has two connecting parts 310 which are connected to two ends of the curved portion 320 respectively. In other embodiments, however, the elastic member 30 may include multiple connecting parts 310 and multiple curved portions 320. As FIGS. 4A-4B show, the elastic member 30 has three connecting parts 3101, 3102, 3103 and two curved portions 3201, 3202. Similar to the embodiment shown in FIG. 3B, in this embodiment, two ends of each curved portion are connected to two connecting parts 310 respectively. Moreover, the curved portions 3201 and 3202 shown in FIG. 4B are both connected to the connecting part 3102, wherein five parts including the curved portion 3201, the connecting part 3101 connected only to the curved portion 3201, the connecting part 3102, the curved portion 3202, and the connecting part 3103 connected only to the curved portion 3202 together form an integral elastic member 30. Alternatively, as the embodiment shown in FIG. 5A-5B, the elastic member 30 includes a single connecting part 310 connected to the curved portion 320. That is, the curved portion 320 of the elastic member 30 is secured on the sidewall 11 by only one connecting part 310 allowing the middle section 321 of the curved portion 320 to protrude toward and contact the first edge 201 of the light guide plate 20. In other embodiments, the number of the elastic member or the number of the curved portion can further be adjusted in response to the requirement of light guide plate positioning and degree of freedom.

Figure 5B:
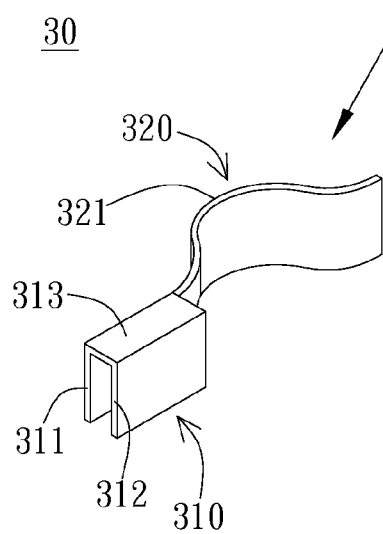
FIG. 5B is a schematic view of the first positioning unit of another embodiment of the present invention.
Figure 6A:
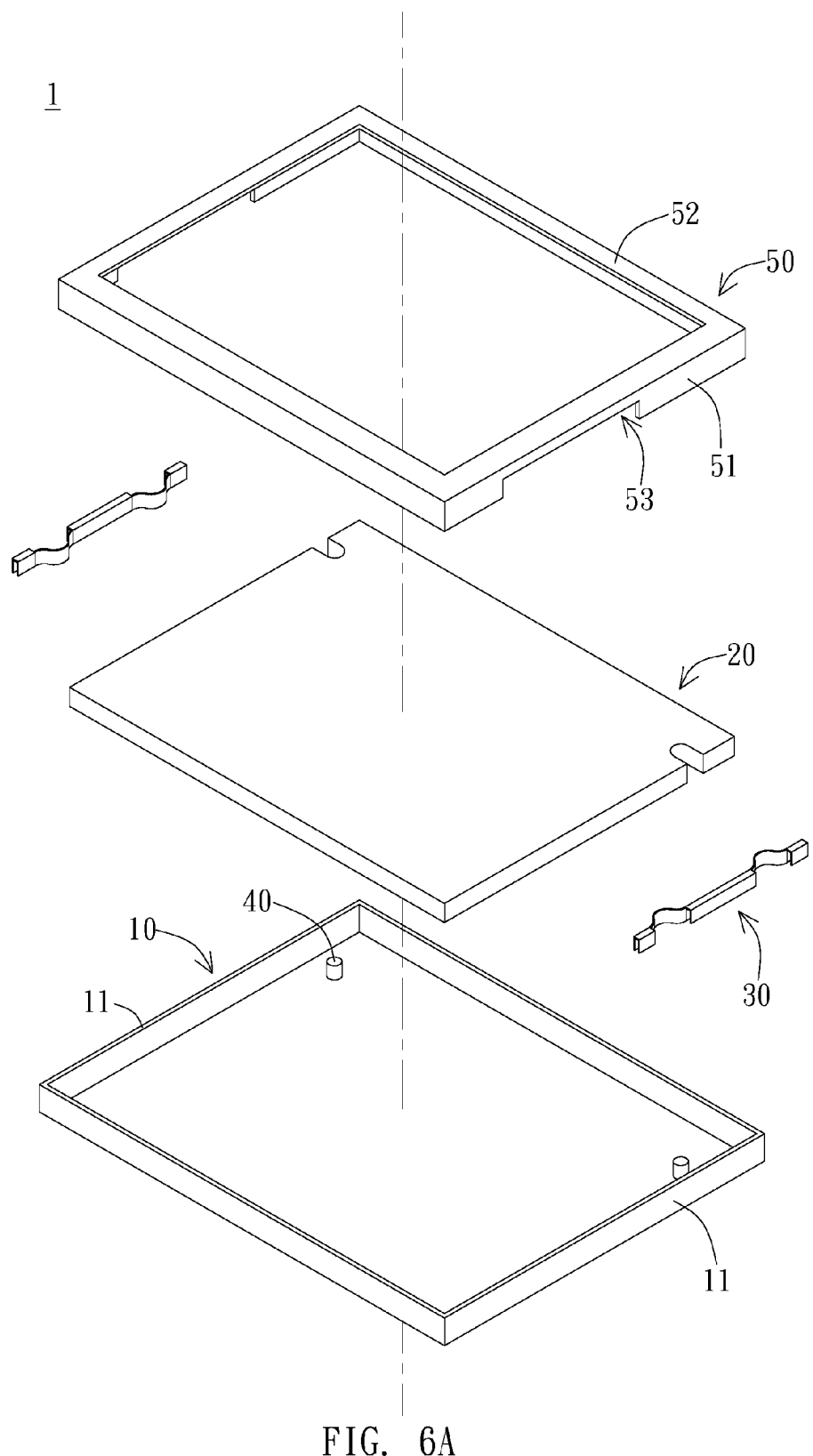
FIG. 6A is a schematic view of another embodiment of the present invention.
Figure 6B:
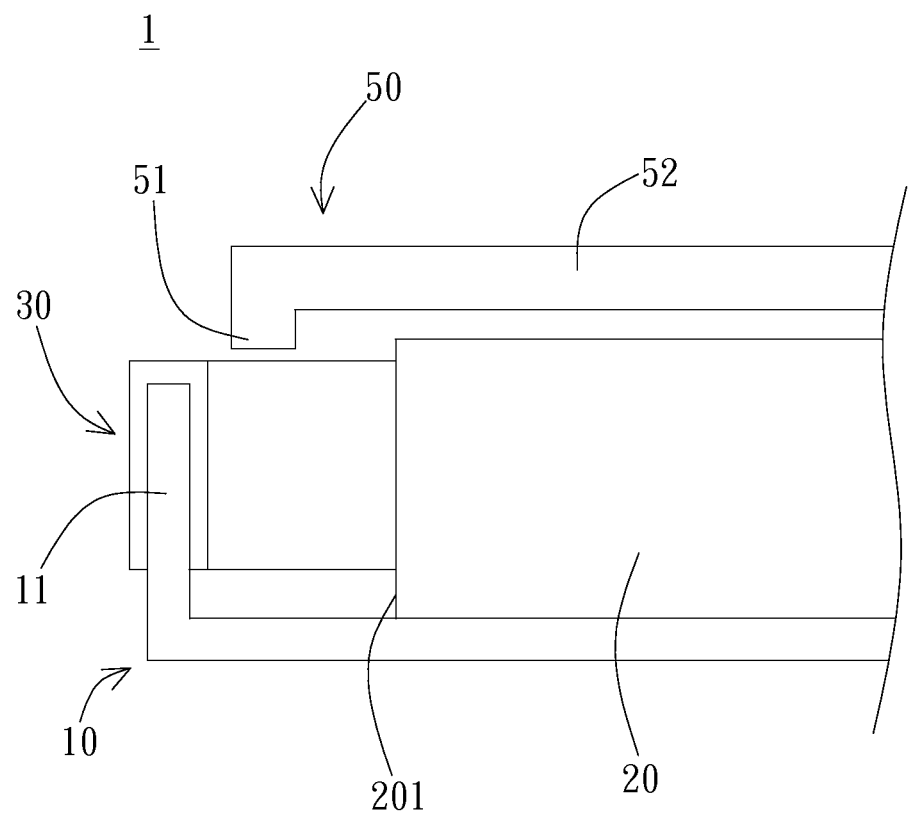
FIG. 6B is a side view of another embodiment of the present invention.

In an embodiment shown in FIGS. 6A-6B, the backlight module 1 further includes a positioning frame 50 disposed on the base 10 for disposition of other components on the light guide plate 20. The positioning frame 50 includes a side plate 51 contacting the base 10. The side plate 51 is situated between the sidewall 11 and the first edge 201 of the light guide plate 20, extending along and parallel to the sidewall 11. In addition, the positioning frame 50 further includes a top plate 52, wherein the top plate 52 is connected to the top side of the side plate 51 and is perpendicular to the side plate 51. Above the top plate 52, a display panel or other components is disposed over the light guide plate 20. When the elastic member 30 shown in FIG. 3B, 4B, or 5B is applied, the side plate 51 of the positioning frame 50 is disposed on the path that the curved portion 320 of the elastic member 30 protrudes toward the first edge 201 of the light guide plate 20, hindering the curved portion 320 in contact with the first edge 201. As a result, when the positioning frame 50 is incorporated with the elastic member 30, an opening 53 is formed corresponding to a projection area of the elastic member 30 on the side plate 51 to allow the curved portion 320 to pass through and to contact the first edge 201. Meanwhile, the elastic member 30 prevents the light guide plate 20 from directly hitting against the side plate 51 of the positioning frame 50.

Figure 7A:
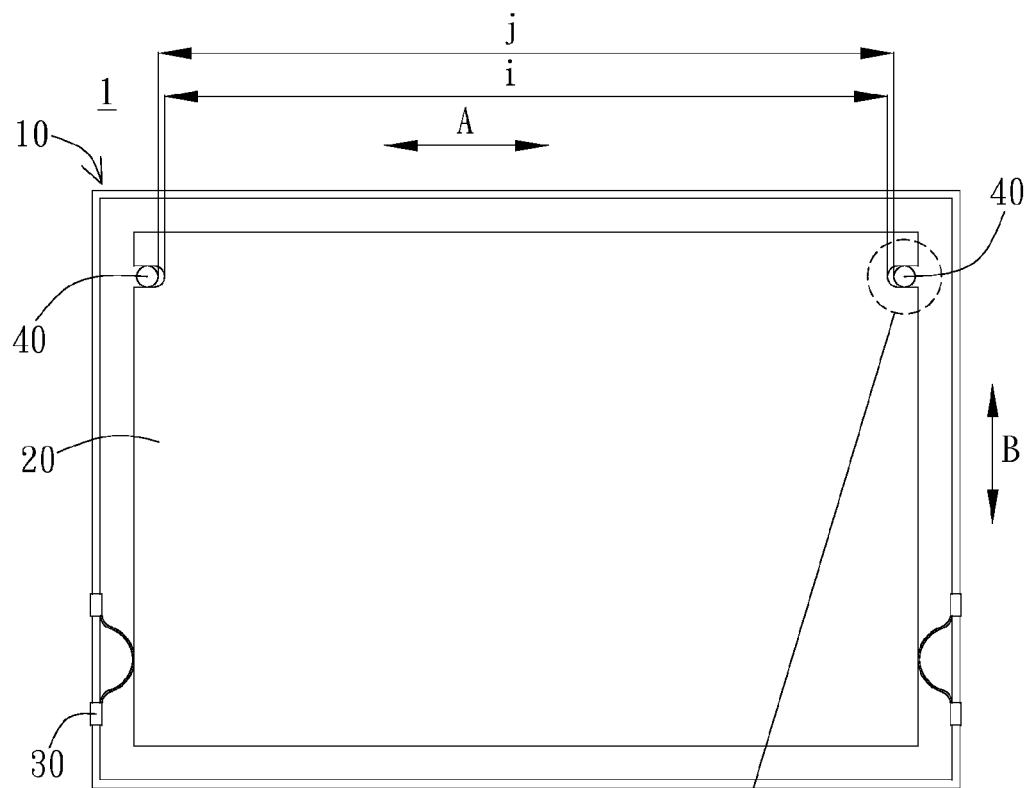
FIG. 7A is a schematic view of the second positioning unit of the embodiment of the present invention.
Figure 7B:
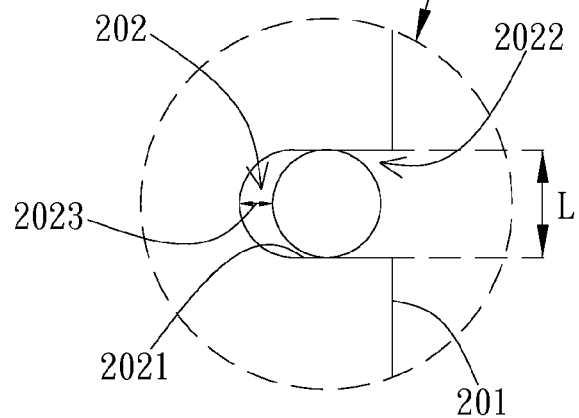
FIG. 7B is a schematic view of the second positioning unit of FIG. 7A positioning the light guide plate.

In the preferred embodiment of the present invention, the second positioning unit 40 is a positioning pillar. As FIG. 2 shows, the positioning pillar 40 can be disposed on the base 10 by way of riveting. The positioning pillar is preferably a cylinder, wherein the bottom of the cylinder is a circle having a diameter L. When the light guide plate 20 is positioned on the base 10 by means of the positioning pillar 40, a positioning groove 202 is preferably formed in the light guide plate 20, wherein the positioning pillar 40 is received in the positioning groove 202 and touches against a wall of the positioning groove 202. As FIGS. 7A-7B show, the positioning groove 202 is formed along the first direction A from the first edge 201 of the light guide plate 20 toward a direction opposite to the first edge 201. In addition, the positioning groove 202 has an opening 2022 at the first edge 201, wherein the length of the opening 2022 in the second direction B is equal to the length of the positioning groove 202 in the second direction B.

However, the length of the positioning groove 202 in the first direction A is greater than the length in the second direction B. Because the positioning pillar 40 resists the displacement of the light guide plate 20 and positions the light guide plate 20 relatively to the sidewall 11 in the second direction B by touching against the wall 2021 of the positioning groove 202, the length of the positioning groove 202 in the second direction B is equal to the diameter L of the positioning pillar 40. On the other hand, because the length of the positioning groove 202 in the first direction A is greater than the length in the second direction B, a gap 2023 may exist between the positioning pillar 40 and the wall 2021 in the first direction A; in other words, a distance i in the first direction A between the wall 2021 adjacent to the gap 2023 on one side and the other wall 2021 adjacent to the other gap 2023 on the other side is smaller than a distance j in the first direction A between one end of the positioning pillar 40 nearest the gap 2023 and one end of the other positioning pillar 40 nearest the other gap 2023. That is, the positioning pillar 40 does not contact with the wall 2021 in the first direction A. In view of discussions set forth above, the positioning pillar 40 only resists the displacement of the light guide plate 20 in the second direction B. Therefore, it prevents overdesign and is preferable in production control and production test. In summary, the positioning pillar 40 achieves the purpose of resisting the displacement of the light guide plate 20 in the second direction B, and the positioning pillar 40 together with the above elastic member 30 achieves the resistance to displacements of the light guide plate 20 in the first direction A and the second direction B.

Figure 8A:
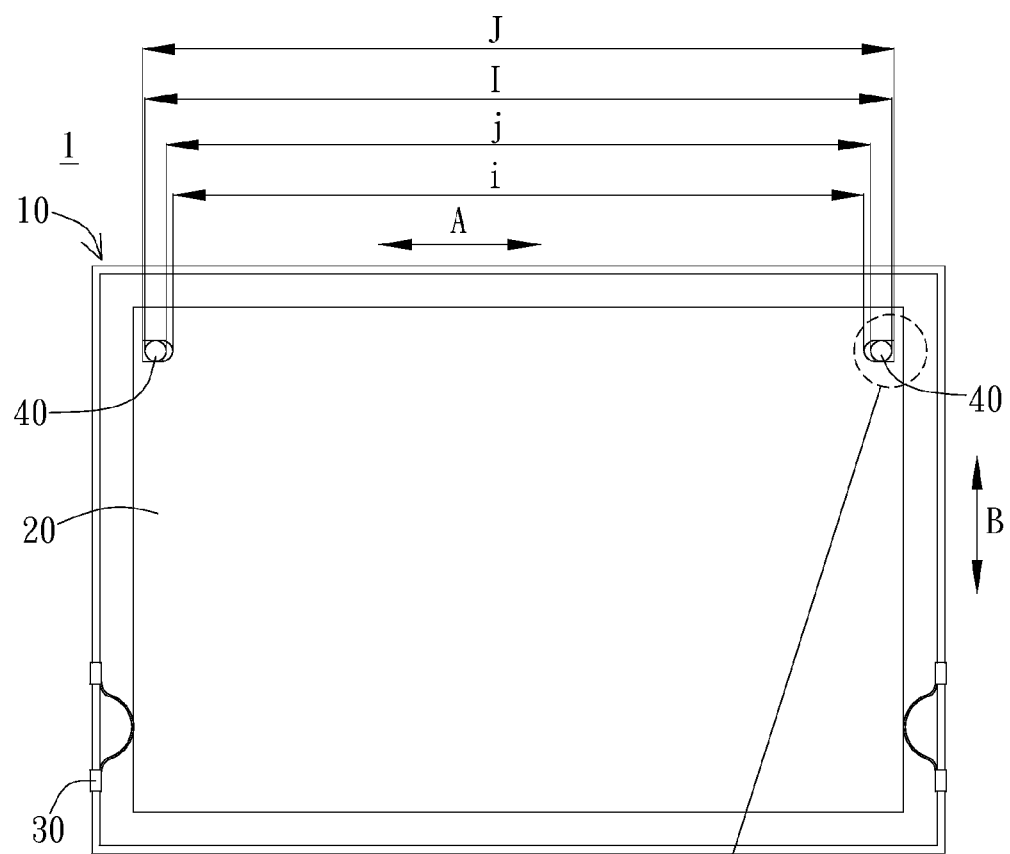
FIG. 8A is a schematic view of another embodiment of the present invention.
Figure 8B:
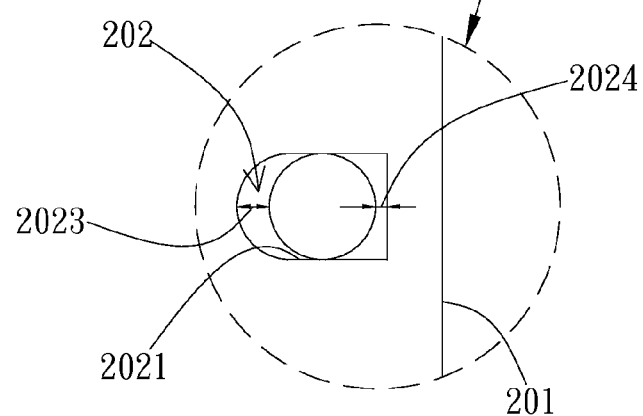
FIG. 8B is a schematic view of the second positioning unit of FIG. 8A positioning the light guide plate.

In other embodiments, the positioning groove 202 is not formed from the first edge 201 of the light guide plate 20, but is formed directly in a portion of the light guide plate 20 that is away from the first edge 201, as FIGS. 8A-8B show. In other words, the end of the positioning groove 202 nearest the first edge 201 is a closed end as part of the wall 2021, instead of an opening. In addition, as the discussions set forth above, because the positioning pillar 40 only resists the displacement of the light guide plate 20 in the second direction B (i.e. the positioning pillar 40 touches against the wall 2021 of the positioning groove 202 in the second direction B), the gap 2023 and the gap 2024 exist in the first direction A between the positioning pillar 40 and the wall 2021 in opposite sides with respect to the positioning pillar 40. Moreover, the distance i in the first direction A between the wall 2021 adjacent to the gap 2023 on one side and the other wall 2021 adjacent to the other gap 2023 on the other side is smaller than the distance j in the direction A between one end of positioning pillar 40 nearest the gap 2023 and one end of the other positioning pillar 40 nearest the other gap 2023. Moreover, the distance J in the first direction A between the wall 2021 adjacent to the gap 2024 on one side and the other wall 2021 adjacent to the other gap 2024 on the other side is greater than the distance I in the direction A between one end of positioning pillar 40 nearest the gap 2024 and one end of the other positioning pillar 40 nearest the other gap 2024.

Figure 9A:
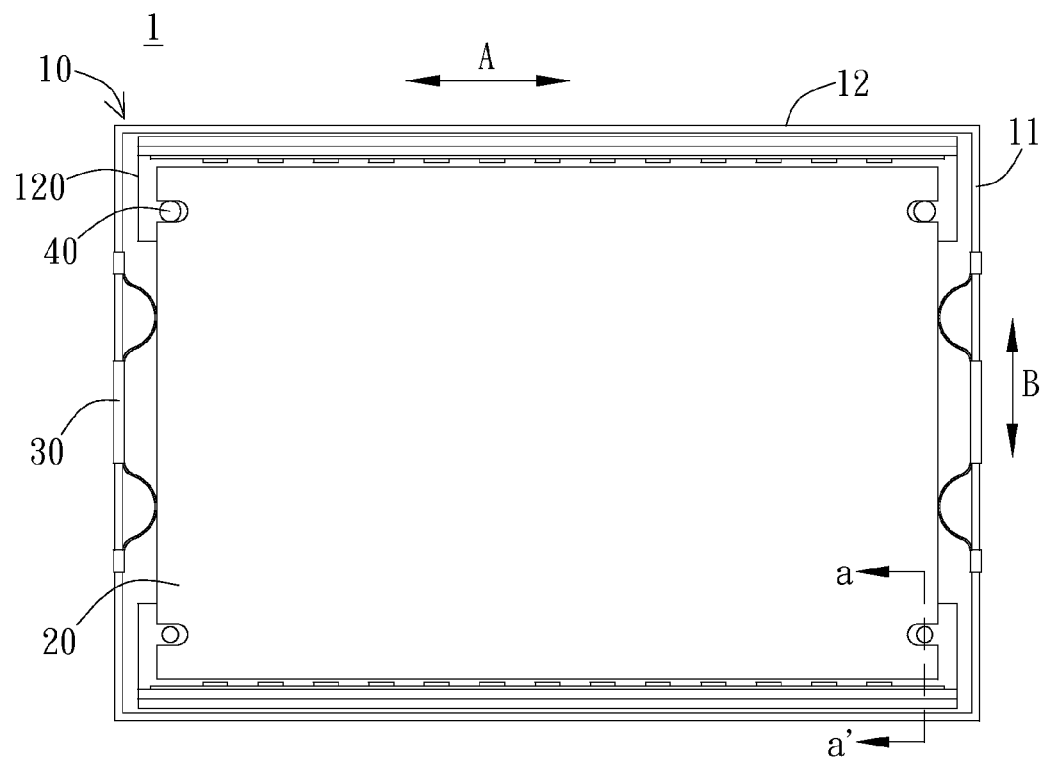
FIG. 9A is a top view of another embodiment of the present invention.
Figure 9B:
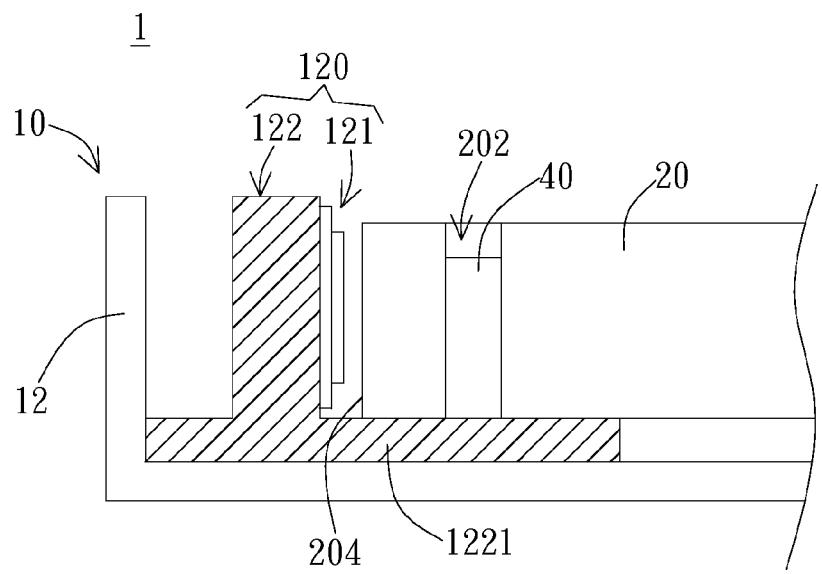
FIG. 9B is a cross-sectional view of FIG. 9A along a sectional line a-a'.

In the other embodiment of the present invention, as FIGS. 9A-9B show, the base 10 of the backlight module 1 further includes a back plate 12 and a light source module 120. Wherein the back plate 12 is connected to one side of the sidewall 11. The light source module 120 is disposed on the back plate 12 and includes a light source 121 and a holder 122. The light source 121 is connected to the holder 122, wherein the light source 121 and the holder 122 both extend along the first direction A. The light source 121 emits light toward a second edge 204 of the light guide plate 20. The holder 122 has a baseplate 1221. In the preferred embodiment, the baseplate 1221 is also a heat dissipation plate, wherein the baseplate 1221 protrudes in the second direction B from the backplate 12 toward the light guide plate 20 and is situated between the base 10 and the light guide plate 20. Meanwhile, the positioning pillar 40 is disposed on the baseplate 1221, and the positioning pillar 40 together with the positioning groove 202 positions the light guide plate 20 and stably maintains a distance between the light guide plate 20 and the light source 121. In the embodiment of the present invention, the base 10 may be the baseplate or the heat dissipation plate, and the positioning pillar 40 can be integrally formed with the baseplate or the heat dissipation plate. The present invention is not limited to the description above, and the person skilled in the art may depend on actual requirements to modify the present invention.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A backlight module, comprising:
   a base with at least a sidewall;
   a light guide plate disposed horizontally on the base, the light guide plate having a first edge corresponding to the sidewall;
   an elastic member, disposed on the sidewall, for contacting the light guide plate to position the light guide plate relative to the sidewall in a first direction perpendicular to the sidewall; and
   a second positioning unit, disposed on the base, for contacting the light guide plate to position the light guide plate relative to the sidewall in a second direction parallel to the sidewall,
   wherein a resistance of the elastic member to a displacement of the light guide plate is greater than a resistance of the second positioning unit to the displacement of the light guide plate, the elastic member tolerates a displacement of the light guide plate more than the second positioning unit does.

2. The backlight module of claim 1, wherein the elastic member has a connecting part and a curved portion, the connecting part is connected to the sidewall of the base, the curved portion protrudes toward and contacts against the first edge of the light guide plate.

3. The backlight module of claim 2, wherein the connecting part includes:
   a first clip portion connected with the curved portion;
   a second clip portion disposed parallel to the first clip portion; and
   a bridging portion connecting to a side of the first clip portion and a side of the second clip portion,
   wherein the connecting part is disposed across the sidewall, the bridging portion traverses across a top of the sidewall, and the first chip portion and the second clip portion are disposed on two opposite sides of the sidewall.

4. The backlight module of claim 2, wherein the elastic member comprises multiple connecting parts, two ends of the curved portion respectively connect with different connecting parts, a middle section of the curved portion protrudes toward the light guide plate to form an arch shape.

5. The backlight module of claim 2, wherein the sidewall is more rigid than the elastic member.

6. The backlight module of claim 5, wherein a thickness of the sidewall is greater than a thickness of the elastic member.

7. The backlight module of claim 2, further comprising a positioning frame disposed between the sidewall and the first edge, wherein the positioning frame has an opening, and the curved portion of the elastic member passes through the opening to contact the first edge.

8. The backlight module of claim 1, wherein the second positioning unit is a positioning pillar, a positioning groove is formed in the light guide plate, and the positioning pillar is received in the positioning groove and touches against a wall of the positioning groove.

9. The backlight module of claim 8, wherein a length of the positioning groove in the first direction is greater than a length of the positioning groove in the second direction.

10. The backlight module of claim 9, wherein a gap exists between the positioning pillar and the wall of the positioning groove in the first direction, and the positioning pillar touches against the wall of the positioning groove in the second direction.

11. The backlight module of claim 1, wherein the base is a heat dissipation plate or a back plate.

12. The backlight module of claim 9, wherein the base includes:
   a back plate, wherein the sidewall is connected to a side of the back plate; and
   a light source module, disposed on the back plate, including a light source and a holder,
   the light source extending along the first direction and being connected to the holder, the
   light source emitting light toward a second edge of the light guide plate,
   wherein the holder has a baseplate disposed between the back plate and the light guide plate, and the positioning pillar is disposed on the baseplate.

13. A backlight module, comprising:
   a base comprising at least a sidewall;
   a light guide plate, disposed horizontally on the base, having a first edge corresponding to the sidewall;
   an elastic member having a connecting part and a curved portion, the connecting part being
   connected to the sidewall of the base, the curved portion protruding toward and touching
   against the first edge of the light guide plate in a direction toward an inner area of the light
   guide plate, wherein the elastic member positions the light guide plate relative to the sidewall in a first direction perpendicular to the sidewall.

14. The backlight module of claim 13, wherein the connecting part includes:
   a first clip portion connected with the curved portion;
   a second clip portion disposed parallel to the first clip portion; and
   a bridging portion connected between the first clip portion and the second clip portion,
   wherein the connecting part is disposed across the sidewall, the first chip portion and the
   second clip portion are disposed on two opposite sides of the sidewall, and the bridging
   portion traverses across the sidewall.

15. The backlight module of claim 13, wherein the elastic member comprises multiple connecting parts, wherein two ends of the curved portion respectively connect with different connecting parts, and a middle section of the curved portion protrudes toward the light guide plate to form an arch shape.

16. The backlight module of claim 13, wherein the sidewall is more rigid than the elastic member.

17. The backlight module of claim 16, wherein a thickness of the sidewall is greater than a thickness of the elastic member.

18. The backlight module of claim 13, further comprising a positioning frame disposed between the sidewall and the first edge, wherein the positioning frame has an opening, and the curved portion of the elastic member protrudes through the opening to touch against the first edge.

19. The backlight module of claim 13, further comprising a positioning pillar disposed on the base, wherein a positioning groove is formed in the light guide plate, the positioning pillar is received in the positioning groove and touches against a wall of the positioning groove, and the positioning pillar positions the light guide plate relative to in a second direction parallel to the sidewall.

20. The backlight module of claim 13, wherein a length of the positioning groove in the first direction is greater than a length of the positioning groove in the second direction.

21. The backlight module of claim 20, wherein a gap exists between the positioning pillar and the wall of the positioning groove in the first direction, and the positioning pillar touches against the wall of the positioning groove in the second direction.

22. The backlight module of claim 13, wherein the base is a heat dissipation plate or a back plate.

23. The backlight module of claim 20, wherein the base includes:
- a back plate, wherein the sidewall is connected to a side of the back plate; and
- a light source module, disposed on the back plate, including a light source and a holder, the
- light source extending along the first direction and being connected to the holder, the light
- source emitting light toward a second edge of the light guide plate,
- wherein the holder has a baseplate disposed between the back plate and the light guide plate, and the positioning pillar is disposed on the baseplate.

* * * * *